United States Patent Office 3,117,997
Patented Jan. 14, 1964

3,117,997
UREA DIHALIDES AND PROCESS FOR THE PRODUCTION THEREOF
Engelbert Kühle, Cologne-Stammheim, Richard Wegler, Leverkusen, and Ludwig Eue, Cologne-Mulheim, Germany, assignors to Farbenfabriken Bayer Aktiengesellschaft, Leverkusen, Germany, a corporation of Germany
No Drawing. Filed Jan. 11, 1961, Ser. No. 81,931
Claims priority, application Germany Jan. 19, 1960
7 Claims. (Cl. 260—570.5)

The present invention relates to and has as its objects new and useful herbicidal active urea dihalides of the general formula $$R_1\diagdown_{R_2}\!\!N\!-\!\!\overset{\overset{\displaystyle X}{|}}{\underset{\underset{\displaystyle X}{|}}{C}}\!-\!N\diagup^{R_3}_{R}$$

and processes for their preparations.

In the above formula $R_1$ stands for an optionally substituted aromatic radical, $R_2$, $R_3$ and $R_4$ denote hydrogen, optionally substituted alkyl or aryl radicals, and X represents chlorine or bromine, these being the halogens having an atomic number from 17 to 35.

A preferred method to make these compounds consists in reacting corresponding ureas with phosphorus-pentahalides as is to be seen from the following reaction scheme:

$$R_1\diagdown_{R_2}\!\!N\!-\!\!\overset{\overset{\displaystyle R_3}{|}}{\underset{\underset{\displaystyle O}{||}}{C}}\!-\!N\diagup^{R_3}_{R_4} \xrightarrow{PX_5} R_1\diagdown_{R_2}\!\!N\!-\!\!\overset{\overset{\displaystyle X}{|}}{\underset{\underset{\displaystyle X}{|}}{C}}\!-\!N\diagup^{R_3}_{R_4} + POX_3$$

The symbols here have the same significance as said above.

Ureas suitable for this reaction are, for example, N-phenyl-N'-methyl urea, N-phenyl-N',N'-dimethyl urea, N-(4-chlorophenyl)-N',N'-dibutyl urea, N,N'-diphenyl-N-methyl urea and the like.

The reaction which in general proceeds exothermically is advantageously carried out at room temperature or at most at slightly elevated temperatures. Preferably an inert organic solvent such as carbon tetrachloride, chlorobenzene or dichloro-benzene is used for control of the reaction. In some cases, it is especially advantageous to use as solvent phosphorus oxychloride which is also formed in the above reaction.

Another method to prepare the inventive compounds is to add hydrogenhalides to α-haloformamidines which are known, e.g., from copending application U.S. Serial No. 28,555 or also from Belgian patent specification 585,681.

This reaction may be represented by the following equation $$R_2\!-\!N\!=\!\!\overset{\overset{\displaystyle R_3}{|}}{\underset{\underset{\displaystyle X}{|}}{C}}\!-\!N\diagup^{R_3}_{R_4} \xrightarrow{HX} \diagdown\!\!N\!-\!\!\overset{\overset{\displaystyle X}{|}}{\underset{\underset{\displaystyle X}{|}}{C}}\!-\!N\diagup^{R_3}_{R_4}$$

as it is to be seen $R_1$ of the above formula will be hydrogen in the instant case. The other symbols have the same significance as said before. Also this reaction optionally is carried out in inert organic solvents, especially those mentioned above.

The new compounds may be used as intermediates for further syntheses. They possess, moreover, a herbicidal action. When used in this way, they are preferably applied in a mixture with inert materials such as talc or kaolin, inter alia.

The inventively new compounds exhibit the same way of action and may be used against the same weeds as the known commercial urea herbicides such as Monuson which is 3-(para-chlorophenyl)-1,1-dimethyl urea, Diuron which is 3-(3,4-dichlorophenyl)-1,1-dimethyl urea; and the like.

The following examples are given for the purpose of illustrating the invention.

Example 1

Cl—⟨C₆H₄⟩—NH—C(Cl)(Cl)—N(CH₃)(CH₃)

Into a suspension of 120 g. of phosphorus pentachloride in 140 ml. of $POCl_3$, 115 g. of N-(4-chlorophenyl)-N',N'-dimethyl urea are introduced in small portions. With a temperature rise up to about 35° C., dissolution slowly sets in. The solution is heated on the water bath, whereby crystallisation sets in at about 80° C. After stirring the mass in the hot for about 1 hour, it is filtered off with suction when cold and then washed with benzene. 128 g. of the dichloride of M.P. 188–191° C. (decomposition) are obtained.

When N-(4-chlorophenyl)-N,N',N'-trimethyl urea is used as starting material, the urea dichloride of the formula Cl—⟨C₆H₄⟩—N(CH₃)—C(Cl)(Cl)—N(CH₃)(CH₃)

is obtained.

By the same way there may be obtained the following compounds

Cl—⟨C₆H₄(Cl)⟩—NH—C(Cl)(Cl)—N(CH₃)(CH₃)

Cl—⟨C₆H₄⟩—NH—C(Br)(Br)—N(CH₃)(CH₃)

Cl—⟨C₆H₄⟩—N(CH₃)—C(Cl)(Cl)—N(CH₃)(CH₃)

Cl—⟨C₆H₄⟩—N(C₂H₅)—C(Cl)(Cl)—N(CH₃)(CH₃)

Example 2

⟨C₆H₅⟩—NH—C(Cl)(Cl)—N(CH₃)(CH₃)

32.8 g. of N-phenyl-N',N'-dimethyl urea are introduced into a suspension of 42 g. of $PCl_5$ in 70 ml. of phosphorus oxychloride and subsequently heated for 1 hour on a boiling water bath. The reaction solution which crystallises upon cooling is filtered off with suction. The dichloride melts at 171° C. after recrystallisation from dioxane.

By the same way there may be obtained the following compounds:

$H_3C$—⟨C₆H₄⟩—NH—C(Cl)(Cl)—N(CH₃)(CH₃)

⟨C₆H₄(Cl)⟩—NH—C(Cl)(Cl)—N(CH₃)(CH₃)

⟨C₆H₅⟩—NH—C(Cl)(Cl)—N(C₃H₇)(C₃H₇)

⟨C₆H₅⟩—NH—C(Cl)(Cl)—N(C₂H₅)(C₂H₅)

We claim:
1. A compound of the general formula

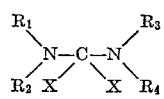

wherein $R_1$ stands for a member selected from the group consisting of phenyl and chlorophenyl groups, $R_2$ denotes a member selected from the group consisting of hydrogen and lower alkyl radicals up to 4 carbon atoms, $R_3$ and $R_4$ stand for lower alkyl radicals up to 4 carbon atoms and X represents halogen having an atomic number from 17 to 35.

2. A compound of claim 1 wherein $R_1$ is phenyl and $R_2$ is hydrogen.

3. A compound of claim 1 wherein $R_1$ is chlorophenyl and $R_2$ is hydrogen.

4. A compound of claim 1 wherein $R_1$ is chlorophenyl and $R_2$ is a lower alkyl radical having up to 4 carbon atoms.

5. The compound of the following formula

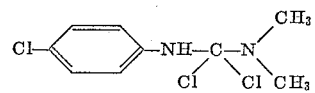

6. The compound of the following formula

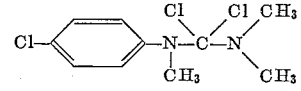

7. The compound of the following formula

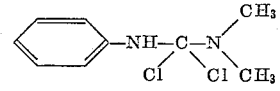

No references cited.